United States Patent Office 2,852,572
Patented Sept. 16, 1958

2,852,572

PRODUCTION OF TRICHLOROETHYLENE SUITABLE FOR PHARMACEUTICAL USE

Julius G. Shukys, Chatham Township, Morris County, and Ashton M. Lyon, Summit, N. J., assignors to Air Reduction Company, Incorporated, New York, N. Y., a corporation of New York No Drawing. Application September 11, 1953
Serial No. 379,719

7 Claims. (Cl. 260—652.5)

The present invention relates to the production of a stabilized, pharmaceutically-pure grade of substituted polychloroethylenes which are suitable for use in humans as anesthetic or analgesic agents. More particularly, the invention relates to the production of trichloroethylene in such stabilized and purified form, from commercially available grades of this compound.

Trichloroethylene is most readily available, commercially, in "extraction grade" containing triethylamine as a stabilizing agent. In addition to the amine this grade contains sufficient amounts of chloride ion, acetylenic compounds and other impurities to render the agent in such form unsuitable for pharmaceutical purposes. An object of the present invention is to provide a convenient and inexpensive method of treating such commercial grades of trichloroethylene containing contaminating impurities consisting principally of amines, chloride ion and acetylenic impurities so as to remove the contaminants and afford a purified form of the polychloroethylene suitable for pharmaceutical use as an anesthetic or analgesic agent.

A further object of the invention is to provide such a method which utilizes an adsorption agent efficacious for the removal of the principal contaminants in a single treatment.

A further object of the invention is to provide a method for purification of commercially available grades of trichloroethylene and similar polychloroethylenes wherein the purified product will be free of undesirable odors or other physical or chemical properties making such products unsuitable for use in humans as an inhalation anesthetic or analgesic agent.

A further object of the invention is to provide such a method utilizing an adsorption agent which possesses a high capacity for removing contaminating impurities and which may be readily regenerated for continued use so as to provide economic operation.

Another object of the invention is to provide an inexpensive and efficient method for producing large quantities of trichloroethylene in a stabilized and purified form ready for use for pharmaceutical purposes.

According to the invention, commercial grades of substituted polychloroethylenes, such as trichloroethylene, containing amines, chloride ion and acetylenic compounds as the principal contaminating impurities which render such raw product unfit for use as a pharmaceutical agent, are treated with activated alumina for the removal of such impurities and the product so treated obtained in the absence of air and stabilized with the addition of a pharmaceutically suitable stabilizing agent. Preferably the activated alumina is in finely divided form and provided as a bed through which the raw grade of the polychloroethylene to be treated is passed. The effluent is then obtained under a protective inert gaseous atmosphere, such as nitrogen, and a stabilizing agent, such as U. S. P. (U. S. Pharmacopoeia) thymol added thereto while under the protection of such inert gas. Other stabilizing agents acceptable under the requirements of the U. S. Pharmacopoeia may also be used.

The standards of purity for pharmaceutical use have been based upon the specifications for trichloroethylene given in the U. S. Pharmacopoeia XIV, pages 636–637, with respect to tests for non-volatile residue, acidity, chloride ion and acetylene (acetylenic compounds) and the British Pharmacopoeia (1948), 589, for tests to determine the presence of phosgene. A maximum of 5 p. p. m. has been established as the standard for amine content. Upon purification of the crude or commercial grades which fail to pass such tests, the product recovered must give negative tests for chloride ion, acetylenic compounds, acidity and phosgene according to the procedures outlined above and must contain less than 5 p. p. m. of amine as NaOH.

Several common adsorbent agents have been tested and found unsatisfactory for the purpose of the present invention. For example, charcoal was utilized in a manner similar to the methods outlined herein and was found to be completely unsatisfactory as an adsorbing agent for triethylamine; similarly, bauxite (low-iron Poracel, a product of Attapulgus Clay Co.) was found to have a considerably lower capacity for the removal of triethylamine. Silica gel was also utilized and found to be effective for the removal of the contaminating impurities, but the effluent treated in this manner contained an extremely unpleasant odor rendering it unsuitable especially for pharmaceutical uses as an inhalant agent. An ion-exchange resin (IRC–50, a product of Rohm & Hass Co.) failed to remove acetylenic impurities.

The invention may be carried out in the conventional type of apparatus utilized for adsorption type purification processes consisting essentially of a reactor tower in which a bed of the agent is provided and a suitable receptacle in which the effluent is collected. Suitable conduits are provided for connecting a feed drum of the commercial grade material with one end of the tower and similar conduits for carrying the effluent from the the other end of the tower to the collection receptacle. In the apparatus used for practicing the invention the arrangement was such that the inlet material was passed upwardly through the tower. In addition, the outlet conduits of the reactor tower are connected with the receptacle so as to be substantially gastight or at least to exclude the surrounding atmosphere. A suitable gas fitting is provided to enable the collection receptacle and the effluent pipes to be flushed with a protective gas such as nitrogen and to eliminate air therefrom. The usual arrangements are also provided for draining and flushing the tower.

In practicing the invention the entire apparatus is first flushed with nitrogen or other suitable inert gas to eliminate air. The commercial grade of trichloroethylene is then pumped, or caused to flow by gravity, through the reactor tower and the bed of activated alumina therein. The effluent is then drawn off and deposited in the collection receptacle under a protective gas atmosphere to prevent contact of the effluent with air and a stabilizing agent added thereto. Preferably suitable means are provided for agitating the solution contained in the receptacle to insure adequate and complete mixing of the stabilizing agent with the purified effluent before it is permitted to come into contact with air.

When the effluent is obtained without the exclusion of air from the collection receptacle, samples tested were found to be contaminated and failed to meet the standards for pharmaceutical use indicated above. The capacity of the activated alumina is considerably reduced when it contains an excessive amount of moisture. It is therefore preferred that the alumina be activated after it is received from commercial sources and before it is placed in use. It has been found that the practical limit or capacity of the activated alumina for the removal of the impurities is about one gallon of trichloroethylene (12.2 lbs.) per pound of alumina. These figures are based on the use of 28–48 mesh F–1 Alcoa (a product of Aluminum Co. of America) activated alumina which has been found to be suitable for the purposes of the present invention. Reactivation of the alumina is effected by passing heated air through the alumina in a direction opposite to the flow of liquid therethrough during purification. The air used for regeneration is flushed from the system with nitrogen prior to subsequent use for purification. Any remaining air is eliminated by collecting the first few gallons of the purified product separately and recycling.

The following examples illustrate the practice of the invention:

Example I

Utilizing apparatus such as generally described above, a tower was packed with 105 lbs. of 28–48 mesh activated alumina (F–1 Alcoa Alumina). The entire system was swept with nitrogen and an atmosphere of nitrogen was maintained in the product drum during the run. The crude material consisting of extraction-grade trichloroethylene (du Pont) was passed upwardly through the packed tower in direct contact with the activated alumina. The first five gallons of effluent material were collected separately, stabilized with triethylamine, and added to the feed material to allow thorough washing of the effluent lines and to permit a check of the product before filling the receptacle with the desired product. Fifty-five gallons of the extraction-grade trichloroethylene were processed. U. S. P. thymol was added to the drum prior to the commencement of the treating procedure such that the final product was stabilized with approximately 0.01 percent thymol. A stirrer was used to agitate the effluent received in the drum to insure complete mixing with the stabilizer.

Upon analysis of the product thus obtained, the test for chloride ion, acetylenic compounds, acidity, and phosgene were negative. The product contained 0.0003 percent triethylamine as sodium hydroxide and the non-volatile matter amounted to 0.0009 gram per 50 ml. of the product. The product thus obtained was the stabilized pure trichloroethylene suitable for use as an anesthetic or analgesic in human patients.

Example II

A series of six runs were made using the same charge of activated alumina (F–1 Alcoa, 28–48 mesh) amounting to approximately 105 lbs. with reactivation between each run. A total of 55 gallons of trichloroethylene was processed in each run, carried out substantially as described above in Example I.

Upon completion of each run, the tower was drained of trichloroethylene, the drainage being assisted by supplying nitrogen gas to the top of the reactor tower. The tower was then heated by means of steam coils arranged around the tower and air from an air heater was passed downwardly through the bed of alumina. The inlet air was maintained at approxiately 225° C. and was passed through the bed at about 12–13 C. F. H. with a pressure drop of 40–50 p. s. i. Regeneration was completed when the outlet air reached 120–130° C.

Analysis of the product obtained in each run gave negative tests for acetylene, chloride ion, phosgene and acidity. The amount of triethylamine, as NaOH, varied from .0001 to .0003 percent and the non-volatile matter varied from zero to .0006 gram per 50 ml. The product in each run was the stabilized and purified grade trichloroethylene desired for pharmaceutical purposes.

While the method of purification herein described is particularly adaptable for treatment of commercial grades of trichloroethylene, it is also advantageously applicable to commercial grades of other polychloroethylenes containing the same impurities. Thus, for example, the method has been used for purifying cis and trans dichloroethylene which were obtained in commercial grades and found not suitable for pharmaceutical purposes. After treatment in accordance with the method described herein, a stabilized and purified grade of agents was obtained suitable for pharmaceutical use in humans.

It is thought that the method may be used also for the treatment of higher olefins containing the same impurities; for example, polychloropropylene or a polychloro olefin wherein an alkyl group is substituted for one or more of the hydrogen atoms of a polychloroethylene.

We claim:

1. The process of producing a preparation of trichloroethylene suitable for use as an inhalation anesthetic or analgesic which consists of purifying a commercial grade trichloroethylene containing contaminating amounts of an amine, acetylenic compounds and chloride ion, by contacting said commercial grade trichloroethylene with activated alumina until substantially free of such impurities, obtaining the purified product and adding a stabilizing agent while the product is substantially free of toxic impurities.

2. The process as defined in claim 1 wherein the purified product is obtained under a protective atmosphere of inert gas.

3. The process as defined in claim 2 wherein the inert gas is nitrogen.

4. The process for the purification of crude trichloroethylene containing an amine, chloride ion and acetylenic compounds as impurities, comprising passing said crude trichloroethylene through a bed of activated alumina to effectively remove said impurities and obtaining the treated product substantially free of such impurities.

5. The process as defined in claim 4 wherein the treated product is obtained under a protective atmosphere of an inert gas.

6. The process as defined in claim 5 wherein the inert gas is nitrogen.

7. The process for removing small contaminating amounts of an amine, acetylenic compounds and chloride ion from commercial, extraction-grade trichloroethylene which comprises contacting in the fluid state the trichloroethylene containing said impurities with activated alumina and withdrawing from said activated alumina said trichloroethylene in a form suitable for pharmaceutical use as an inhalant anesthetic, containing not more than 5 p. p. m. of amines and giving negative tests for chloride ion, acetylenic compounds, acidity and phosgene.

References Cited in the file of this patent

UNITED STATES PATENTS

| | | |
|---|---|---|
| 1,816,895 | Dangelmajer | Aug. 4, 1931 |
| 1,819,585 | Zuckermandel et al. | Aug. 18, 1931 |
| 2,266,719 | Buxton et al. | Dec. 16, 1941 |
| 2,458,819 | Yowell et al. | Jan. 11, 1949 |